United States Patent [19]

Kim et al.

[11] Patent Number: 4,914,178

[45] Date of Patent: Apr. 3, 1990

[54] THERMOPLASTIC POLYETHERESTER BLOCK COPOLYMERS

[75] Inventors: Kyung M. Kim; Sang J. Lee, both of Kumi, Rep. of Korea

[73] Assignee: Kolon Industries, Inc., Seoul, Rep. of Korea

[21] Appl. No.: 292,161

[22] Filed: Dec. 30, 1988

[30] Foreign Application Priority Data

Dec. 31, 1987 [KR] Rep. of Korea .................. 87-15680

[51] Int. Cl.$^4$ ............................................. C08G 63/02
[52] U.S. Cl. ..................................... 528/272; 528/289; 528/296; 528/300; 528/308.6; 528/308.7; 525/437
[58] Field of Search ............... 528/272, 289, 296, 300, 528/308.6, 308.7; 525/437

[56] References Cited

U.S. PATENT DOCUMENTS

| | | | |
|---|---|---|---|
| 4,013,624 | 3/1977 | Hoeschele | 528/300 |
| 4,250,280 | 2/1981 | Tanaka et al. | 525/437 |
| 4,251,652 | 2/1981 | Tanaka et al. | 528/279 |
| 4,315,882 | 2/1982 | Hiratsuka et al. | 264/171 |
| 4,598,117 | 7/1986 | Liu et al. | 524/444 |
| 4,611,021 | 9/1986 | Zamek | 524/317 |

*Primary Examiner*—John Kight
*Assistant Examiner*—Samuel A. Acquah
*Attorney, Agent, or Firm*—Finnegan, Henderson, Farabow, Garrett & Dunner

[57] ABSTRACT

A polyetherester block copolymer has hard and soft segments of the structural formula

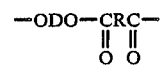 (I)

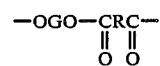

(II)

wherein D is the non-hydroxylic residue of a saturated aliphatic or cyclic diol having 2 to 8 carbon atoms, R is the non-carboxylic residue of an aromatic of aliphatic or cyclic dicarboxylic acid wherein the residue has a molecular weight less than about 500, and G is a polyether having recurring oxyalkylene units and a molecular weight between about 300 and 4,000, and the polymer is branched as a result of having been made from monomers that include a primary or secondary amino branching agent.

5 Claims, No Drawings

THERMOPLASTIC POLYETHERESTER BLOCK COPOLYMERS

This invention relates to thermoplastic polyetherester block copolymers having good heat resistance, good low temperature impact resistance, and good electric recovery properties.

Polyetherester block copolymers have been proposed for various industrial uses, especially because of their possibility of good impact resistance and processability.

Typical copolymers of this type have hard and soft segments wherein the hard segments comprise recurring formula of structure I and the soft segments comprise recurring formula of structure II.

$$-ODO-\underset{\underset{O}{\|}}{C}R\underset{\underset{O}{\|}}{C}- \qquad (I)$$

$$-OGO-\underset{\underset{O}{\|}}{C}R\underset{\underset{O}{\|}}{C}- \qquad (II)$$

wherein D is the non-hydroxylic residue of a saturated cyclic diol or aliphatic glycol containing 2 to 8 carbon atoms, R is the non-carboxylic residue of an aromatic, aliphatic or cyclic dicarboxylic acid and G is a polyether having a molecular weight between about 300 and 4,000.

Polymers of this type have been used jointly with thermoplastic polyurethane for manufacturing high functionality houseware materials. Polymers of this type have been used as films, high elastic fibres, and for injection moulding. When used for injection moulding, such as extrusion and blow moulding, the polymer must meet severe quality and performance conditions such as high melt viscosity and melt strength.

In conventional polyetheresters, it is common for the acid to be terephthalic acid or a mixture with isophthalic acid or aliphatic saturated dicarboxylic acid. The diol conventionally has been ethylene glycol or 1,4-butane diol optionally with other aliphatic diol, while the polyether has conventionally been polyethylene glycol, polypropylene glycol or polytetramethylene glycol.

Unfortunately, such polyetherester copolymers have only been satisfactorily used at temperatures of 100° C. or less due to lack of thermostability, non-uniform strength through the thickness of the articles and inadequate recovery properties, possibly due to unsatisfactory crystallisation properties.

In U.S. Pat. No. 4,013,624, polyetherester copolymers are described that are branched as a result of including in the monomers, from which the polymer is made, a branching agent in an amount of 0.3 to 1.2 equivalents per 100 mole of dicarboxylic acid. The branching agent is a material that has at least three functional groups selected from hydroxyl and carboxyl groups. When the corresponding polymer was made in the absence of the branching agent, an increase in the degree of polymerisation resulted in an increase in the intinsic viscosity of the linear polymer and in a reduction of the proportion of terminal groups. However when the polymerisation was conducted in the presence of the branching agent the content of terminal groups was increased and the thermostability of the product was decreased. The condensation reaction time and the flowability of the product was decreased.

A polyetherester according to the invention is a block copolymer having hard and soft segments wherein the hard segments comprise the recurring formula of structure I and the soft segments comprise the recurring formula of structure II.

$$-ODO-\underset{\underset{O}{\|}}{C}R\underset{\underset{O}{\|}}{C}- \qquad (I)$$

$$-OGO-\underset{\underset{O}{\|}}{C}R\underset{\underset{O}{\|}}{C}- \qquad (II)$$

wherein D is the non-hydroxylic residue of a saturated aliphatic or cyclic diol having 2 to 8 carbon atoms, R is the non-carboxylic residue, an aromatic, aliphatic or cyclic dicarboxylic acid wherein the residue has a molecular weight less than about 500, and G is a polyether having recurring oxyalkylene units and a molecular weight between about 300 and 4,000 and the polyetherester is branched as a result of having been made from monomers that include a branching agent, and is characterised in that the branching agent comprises a primary or secondary amine.

The copolymer of the invention is preferably a random block copolymer.

The copolymer of the invention has improved processing and performance qualities. As a result it can give improved results when exposed to difficult processing conditions such as extrusion and blow moulding. It has improved heat stability and melt viscosity.

The copolymer of the invention can have good softness and can have elastic recovery properties similar to a rubber, but can be superior to a rubber as regards its low temperature impact resistance, chemical resistance and its mechanical properties. Thus it combines the performance, and processing properties, of rubbery and plastic materials and, in general, has excellent thermoplastic properties due to physical cross links within the polymeric structure in preference to chemical cross linking of the type conventionally used for curing low density rubbers.

In the prior art, the internal or physical cross linkage tended to result in reduced hardness, heat resistance, endurance and thermostability, but the inclusion of the amine branching agent results in improved thermostability, melt viscosity and melt strength.

The preferred polymers are those in which D is the divalent radical remaining after removal of the hydroxyl groups from compounds such as ethylene glycol, 1,2-propane diol, 1,3-propane diol, 1,4-butane diol, 1,5-pentane diol, 1,6-hexane diol and 1,4-cyclohexane dimethanol, R is the divalent radical remaining after removal of carboxyl groups from acids such as terephthalic acid, isophthalic acid, orthophthalic acid, adipic acid, suberic acid, azelaic acid, sebacic acid, 1,4-cyclohexane dicarboxylic acid and its alkyl ester of low molecular weight, and G is the divalent radical remaining after removal of pendant hydroxyl groups from poly (alkylene oxide) glycol, such as poly (ethylene oxide) glycol, poly (propylene oxide) glycol and poly (tetramethylene oxide) glycol. Preferably the acid from which R is derived has a molecular weight less than 500. Instead of deriving R from an acid it can, of course, be derived from derivatives that will react in a similar manner, for instance lower alkyl esters.

Preferably the hard segment is formed only from the recurring units of formula I and the soft segment is formed only of recurring units of formula II.

Preferably the proportion of the hard segment is about 20 to 95% by weight of the copolymer. Reducing the amount renders the copolymer more rubbery.

The selection of the polyether influences the properties of the final product since a hydrophilic polyether such as one derived from polyethylene glycol is superior to products based on polypropylene glycol or polytetramethylene glycol as regards oil resistance, whereas a polymer based on polypropylene glycol or polytetramethylene glycol is superior as regards hydrolysis resistance to one based on polyethylene glycol.

The branching agent modifies the thermostability and melt strength. The amount is usually 0.1 to 0.6 mole percent based on the acid component (or its ester derivative). If the amount is below 0.1 mole percent the desired improvements are not obtained and if the amount is above 0.6 mole percent processability and mechanical properties can deteriorate.

The primary or secondary amine branching agent that is used in the invention should be trifunctional or more, at least one of the functional groups being a primary or secondary amine. Other functional groups are usually selected from hydroxyl and carboxyl. Suitable amines include diethanol amine, hexamethylene bis (imino acetic acid), tricine, D- or DL -cerine, DL-threonine hemihydrate, DL-aspartic acid, DL-2-methyl glutamic acid, DL-2-aminoadipic acid, tris (hydroxy methyl) aminomethane.

The branching agent may consist of the amine or it may include also trifunctional or more branching agents that contain only hydroxyl and/or carboxyl groups, such as hexaglycerol, trimellitic acid, trimellitic anhydride, pentaerythritol, glyceric acid, gluconic acid and glucoheptonic acid.

The polymer of the invention can be made by a technique such as the following. The glycol, polyether and acid components that produce the residues D, R and G are charged with appropriate catalysts, heat stabilisers and other additives to a reactor vessel. Water, methanol or other condensation products are distilled out from the reaction mixture as the temperature is raised to a value in the range 200° up to 230° C. Pressure is gradually reduced to 5 mmHg of less and the temperature slowly raised up to 250° to 280° C. The polymerisation mass is stirred and the reaction is subsequently stopped and the product separated from the reaction vessel.

Suitable catalysts for the reaction include organic titanates such as tetraalkyltitanate used alone or in combination with magnesium or calcium acetates. Complex titanates, such as $Mg[HTi(OR)_6]_2$, derived from alkali or alkaline earth metal alkoxides and titanate esters are also very effective. Inorganic titanates such as lanthanum titanate, calcium acetate and antimony trioxide mixtures and lithium and magnesium alkoxides are representative of other catalyst which can be used.

A problem with conventional random block copolymers is their inadequate recovery properties when tensile strength or compressive stress is released, and this is thought to be due to the high crystallisation of the polymer as this tends to freeze the structure. If the deformation is too large then there is permanent deformation of the polymer.

As a result of the defined branching, the forces are distributed more uniformly throughout the structure without destroying the thermoplastic properties of the product.

The presence of the ether components is important in order that the melt viscosity and melt strength is less than would be possessed by the corresponding polyester homopolymer, since the polyether component has a low degree of crystallisation and a high fluidity. Melt viscosity and melt strength can be increased as a result of the entanglement of polymer chains during melting if the polymer is additionally subjected to chemical cross linking of the type conventionally used for curing rubber, and this does not decrease thermoplastic properties. The use of the amine cross linking agent means that highly thermostable products can be obtained since the branching is achieved without a significant increase in hydroxyl and carboxyl terminal groups.

The following examples further illustrate the invention. The catalyst and heat resistant are prepared as follows.

Catalyst; An agitated flask is charged with 95 weight percent of ethyleneglycol and 5 weight percent of tetrabutyl titanate. Agitation is started and the mixture is refluxed at 50° C. for about 3 hour or more until catalyst slurry (A) is prepared. The above method is essentially repeated except that 95 weight percent of 1,4-butandiol instead of 95 weight percent of ethylene glycol until catalyst slurry (B) is prepared.

Heat resistant; 20 g of 3.7-dioctyl phenothiazine, 40 g of dilauryl thiodipropionate 24 g of 1,1,3-tris (2-methyl-4-hydroxy-5-tert-butyl phenyl)butane are mixed with ethylene glycol and prepared 1 kg of slurry (A). The above method is repeated except that 1,4-butane diol instead of ethylene glycol to prepare 1 kg of slurry (B).

In this examples, the simplified characters of components which have polyfunctional radical is follows;
HMBI: Hexamethylene bis(iminoacetic acid)
DEA: Diethanol amine
TRI: Tricine
THAM: Tris(hydroxyl methyl)amino methane
DLA: DL-2-amino adipic acid
DLM: DL-2-methyl glutamic acid
HG: Hexaglycerol
TMA: Trimellitic anhydride
PER: Pentaerythritol

EXAMPLE 1

A stainless steel reactor is charged with 432.6 g of dimethyl telephthalate, 211.7 g of ethylene glycol, 682.4 g of poly(ethylene oxide)glycol having an average molecular weight of 1540, 0.9 g of HMBI and 0.8 g of HG as components having polyfunctional radical, 11 g of catalyst slurry (A) and 12 g of heat resistant slurry (A). Agitation is started and methanol is effluxed as temperature is raised from 150° to 230° C.

Temperature is maintained at 230° C. until methanol distills from reaction mixtures. When the distillation is finished, the pressure is gradually reduced to 0.5 mmHg within 30 minutes. At the same time, the final temperature of the reactor is gradually raised to 270° C. and polycendousation is continued removing the excess glycol. After temperature of reactor is maintained at 270° C. for 45 minutes, the resulting polymer is extracted in a nitrogen charging and allowed to dry at reduced pressure. The final polymer is measured some properties.

The intrinsic viscosity is a data measured by ortho-chlorophenol at 30° C. and unit is dl/g. The melt viscosity is a data measured by RDS-7700 RHEOMETRICS and unit is poise.

The melting point is a data measured by a differential scanning calorimeter [DSC]. The result is shown in Table 1.

EXAMPLE 2~4

Example 1 is essentially repeated according to compositions of reactant which is shown in Table 1.

COMPARATIVE EXAMPLE 1

Example 1 is essentially repeated according to compositions of reactant which is shown in Table 1 except components having polyfunctional radical.

EXAMPLE 5 and COMPARATIVE EXAMPLE 2

Example 1 is essentially repeated according to compositions of Table 2. But the final temperature of reactor is 270° C.

EXAMPLE 9~12 and COMPARATIVE EXAMPLE 3

Example 1 is essentially repeated according to composition of Table 3. But the final temperature of reactor is 270° C.

EXAMPLE 13~32 and COMPARATIVE EXAMPLE 4~8

Example 1 is essentially repeated to measure the data for the above example 13~32 and comparative example 4~8 according to each composition of Table 4~8. But the final temperature is 260° C.

TABLE 1

| EXAMPLE # | EXAMPLE 1 | EXAMPLE 2 | EXAMPLE 3 | EXAMPLE 4 | COMPARATIVE EXAMPLE 1 |
|---|---|---|---|---|---|
| DMT *1 (g) | 432.6 | 432.6 | 432.6 | 432.6 | 432.6 |
| EG *2 (g) | 211.7 | 211.7 | 211.7 | 211.7 | 211.7 |
| PEG *3 (g) | 682.4 | 362.4 | — | — | 682.4 |
| PTMG *4 (g) | — | — | 551.6 | 317.5 | — |
| PPG *5 (g) | — | 186.9 | — | 163.4 | — |
| Polyfunctional component (g) | HMBI 0.9 HG 0.8 | DLA 1.5 | DEA 1.0 | DEA 0.6 TMA 0.8 | — |
| Catalyst A (g) | 11 | 11 | 11 | 11 | 11 |
| Heat resistant A (g) | 12 | 12 | 12 | 12 | 12 |
| Melt point (°C.) | 175~180 | 175~180 | 175~180 | 175~180 | 175~180 |
| Intrinsic viscosity (dl/g) | 1.14 | 1.07 | 1.09 | 1.15 | 1.12 |
| Melt *6 (poise) viscosity | $5.74 \times 10^3$ | $3.08 \times 10^3$ | $6.19 \times 10^3$ | $5.96 \times 10^3$ | $6.28 \times 10^2$ |

*1: Dimethyl telephthalate
*2: Ethylene glycol
*3: Poly(ethylene oxide) glycol, average molecular weight: 1540
*4: Poly(tetramethylene oxide) glycol, average molecular weight: 1000
*5: Poly(propylene oxide) glycol, average molecular weight: 1000
*6: pata measured at 220° C.

TABLE 2

| EXAMPLE # | EXAMPLE 5 | EXAMPLE 6 | EXAMPLE 7 | EXAMPLE 8 | COMPARATIVE EXAMPLE 2 |
|---|---|---|---|---|---|
| DMT (g) | 560.7 | 560.7 | 560.7 | 560.7 | 560.7 |
| DMT *1 (g) | 62.3 | 62.3 | 62.3 | 62.3 | 62.3 |
| EG (g) | 332.7 | 332.7 | 332.7 | 332.7 | 332.7 |
| PEG (g) | 682.4 | 362.4 | — | — | 682.4 |
| PTMG (g) | — | — | 573.7 | 317.5 | — |
| PPG (g) | — | 186.9 | — | 163.4 | — |
| polyfunctional component (g) | DLM 1.9 | DLM 0.9 PER 0.6 | HMBI 2.1 | TRI 0.7 TMA 0.9 | — |
| Catalyst A (g) | 10 | 10 | 10 | 10 | 10 |
| Heat resistant A (g) | 13 | 13 | 13 | 13 | 13 |
| Melting pont (°C.) | 180~185 | 180~185 | 180~185 | 180~185 | 180~185 |
| Intrinsic Viscosity (dl/g) | 1.08 | 1.06 | 1.11 | 0.98 | 1.10 |
| Melt *2 (posie) viscosity | $4.73 \times 10^3$ | $5.21 \times 10^3$ | $6.01 \times 10^3$ | $5.28 \times 10^3$ | $5.42 \times 10^2$ |

*1: Dimethyl isophthalate
*2: Data measured at 225° C.

TABLE 3

| EXAMPLE # | EXAMPLE 9 | EXAMPLE 10 | EXAMPLE 11 | EXAMPLE 12 | COMPARATIVE EXAMPLE 3 |
|---|---|---|---|---|---|
| DMT (g) | 518.2 | 511.4 | 518.2 | 511.4 | 518.2 |
| DMI (g) | 57.5 | — | 57.5 | — | 57.5 |
| DMS *1 (g) | 36.0 | 112.6 | 36.0 | 112.6 | 36.0 |
| EG (g) | 342.0 | 337.2 | 342.0 | 337.2 | 342.0 |
| PEG (g) | — | — | 257.3 | 145.7 | — |
| PTMG (g) | 416.7 | 407.3 | — | 283.8 | 416.7 |

TABLE 3-continued

| EXAMPLE # | EXAMPLE 9 | EXAMPLE 10 | EXAMPLE 11 | EXAMPLE 12 | COMPARATIVE EXAMPLE 3 |
|---|---|---|---|---|---|
| PPG (g) | — | — | 132.7 | — | — |
| Polyfunctional (g) component | PLA 2.1 | HMBI 2.6 | DLM 1.0 HG 0.8 | TRI 1.9 | — |
| Catalyst A (g) | 14 | 14 | 14 | 14 | 14 |
| Heat resistant A (g) | 15 | 15 | 15 | 15 | 15 |
| Melting point (°C.) | 175~180 | 175~180 | 175~180 | 175~180 | 175~180 |
| Intrinsic viscosity (dl/g) | 0.912 | 0.937 | 0.894 | 0.901 | 0.924 |
| Melt viscosity *2 (poise) | $4.17 \times 10^3$ | $4.24 \times 10^3$ | $3.87 \times 10^3$ | $4.98 \times 10^3$ | $3.17 \times 10^2$ |

*1: Dimethyl sebacate
*2: Data measured at 220° C.

TABLE 4

| EXAMPLE # | EXAMPLE 13 | EXAMPLE 14 | EXAMPLE 15 | EXAMPLE 16 | COMPARATIVE EXAMPLE 4 |
|---|---|---|---|---|---|
| DMT (g) | 662.7 | 662.7 | 662.7 | 662.7 | 662.7 |
| 1.4 BD *1 (g) | 551.2 | 551.2 | 551.2 | 551.2 | 551.2 |
| PEG (g) | 938.7 | 498.5 | — | — | — |
| PTMG (g) | — | — | 789.2 | 436.8 | 789.2 |
| PPG (g) | — | 257.1 | — | 224.8 | — |
| Polyfunctional (g) component | DLA 1.1 PER 0.8 | TRI 2.1 | DEA 0.8 HG 0.9 | DEA 1.3 | — |
| Catalyst B (g) | 13 | 13 | 13 | 13 | 13 |
| Heat resistant B (g) | 15 | 15 | 15 | 15 | 15 |
| Melting point (°C.) | 175~180 | 175~180 | 175~180 | 175~180 | 175~180 |
| Intrinsic viscosity (dl/g) | 1.26 | 1.24 | 1.29 | 1.32 | 1.25 |
| Melt viscosity *2 (poise) | $4.17 \times 10^3$ | $3.24 \times 10^3$ | $4.09 \times 10^3$ | $5.24 \times 10^3$ | $4.18 \times 10^2$ |

*1: 1,4-Butan diol
*2: Data measured at 220° C.

TABLE 5

| EXAMPLE # | EXAMPLE 17 | EXAMPLE 18 | EXAMPLE 19 | EXAMPLE 20 | COMPARATIVE EXAMPLE 5 |
|---|---|---|---|---|---|
| DMT (g) | 662.3 | 662.3 | 662.3 | 662.3 | 662.3 |
| DMI (g) | 109.8 | 109.8 | 109.8 | 109.8 | 109.8 |
| 1.4 BD (g) | 613.7 | 613.7 | 613.7 | 613.7 | 613.7 |
| PEG (g) | 671.2 | 357.3 | — | — | — |
| PTMG (g) | — | — | 585.7 | 311.7 | 311.7 |
| PPG (g) | — | 184.1 | — | 160.9 | 160.9 |
| Polyfunctional (g) component | DLM 1.2 PER 1.0 | TRI 2.2 | DEA 0.8 PER 1.3 | HMBI 3.0 | — |
| Catalyst B (g) | 16 | 16 | 16 | 16 | 16 |
| Heat resistant B (g) | 15 | 15 | 15 | 15 | 15 |
| Melting point (°C.) | 175~180 | 175~180 | 175~180 | 175~180 | 175~180 |
| Intrinsic viscosity (dl/g) | 1.17 | 1.15 | 1.20 | 1.13 | 1.18 |
| Melt viscosity *1 (poise) | $3.11 \times 10^3$ | $4.09 \times 10^3$ | $3.82 \times 10^3$ | $4.76 \times 10^3$ | $3.71 \times 10^2$ |

*1: Data measured at 220° C.

TABLE 6

| EXAMPLE # | EXAMPLE 21 | EXAMPLE 22 | EXAMPLE 23 | EXAMPLE 24 | COMPARATIVE EXAMPLE 6 |
|---|---|---|---|---|---|
| DMT (g) | 584.9 | 584.9 | 584.9 | 584.9 | 584.9 |
| DMS (g) | 146.2 | 146.2 | 146.2 | 146.2 | 146.2 |
| 1.4 BD (g) | 615.0 | 615.0 | 615.0 | 615.0 | 615.0 |
| PEG (g) | 502.5 | 265.4 | — | — | 265.4 |
| PTMG (g) | — | — | 438.6 | 235.4 | — |
| PPG (g) | — | 135.2 | — | 120.0 | 135.2 |
| Polyfunctional (g) component | DLM 1.0 PER 0.8 | TRI 2.4 | DEA 1.2 PER 1.3 | THAM 1.7 | — |
| Catalyst B (g) | 14 | 14 | 14 | 14 | 14 |
| Heat resistant B (g) | 14 | 14 | 14 | 14 | 14 |
| Melting point (°C.) | 175~180 | 175~180 | 175~180 | 175~180 | 175~180 |
| Intrinsic viscosity (dl/g) | 1.03 | 1.17 | 1.21 | 1.11 | 1.15 |

TABLE 6-continued

| EXAMPLE # | EXAMPLE 21 | EXAMPLE 22 | EXAMPLE 23 | EXAMPLE 24 | COMPARATIVE EXAMPLE 6 |
|---|---|---|---|---|---|
| Melt *1 (poise) viscosity | $3.27 \times 10^3$ | $2.11 \times 10^3$ | $4.28 \times 10^3$ | $3.69 \times 10^3$ | $2.76 \times 10^2$ |

*1: Data measured at 220° C.

TABLE 7

| EXAMPLE # | EXAMPLE 25 | EXAMPLE 26 | EXAMPLE 27 | EXAMPLE 28 | COMPARATIVE EXAMPLE 7 |
|---|---|---|---|---|---|
| DMT (g) | 562.0 | 562.0 | 562.0 | 562.0 | 562.0 |
| DMCD *1 (g) | 60.5 | 60.5 | 60.5 | 60.5 | 60.5 |
| 1.4 BD (g) | 473.2 | 473.2 | 473.2 | 473.2 | 473.2 |
| CHDM *2 (g) | 52.4 | 52.4 | 52.4 | 52.4 | 52.4 |
| PEG (g) | 662.4 | 333.4 | — | — | 333.4 |
| PTMG (g) | — | — | 532.4 | 296.3 | — |
| PPG (g) | — | 172.7 | — | 147.2 | 172.7 |
| Polyfunctional component (g) | TRI 1.1 TMA 1.6 | DLA 1.7 | THAM 1.4 | HMBI 1.3 HG 0.8 | — |
| Catalyst B (g) | 11 | 11 | 11 | 11 | 11 |
| Heat resistant B (g) | 15 | 15 | 15 | 15 | 15 |
| Melting point (°C.) | 180~185 | 180~185 | 180~185 | 180~185 | 180~185 |
| Intrinsic viscosity (dl/g) | 0.91 | 0.89 | 0.94 | 0.90 | 0.93 |
| Melt *3 (poise) viscosity | $5.21 \times 10^3$ | $4.96 \times 10^3$ | $3.24 \times 10^3$ | $4.08 \times 10^3$ | $4.97 \times 10^2$ |

*1: 1,4-Dimethyl cyclohexane dicarboxylate (trans isomer: 96.5%)
*2: 1,4-Cyclohexane dimethanol (trans isomer: 45%)
*3: Data measured at 220° C.

TABLE 8

| EXAMPLE # | EXAMPLE 29 | EXAMPLE 30 | EXAMPLE 31 | EXAMPLE 32 | COMPARATIVE EXAMPLE 8 |
|---|---|---|---|---|---|
| DMT (g) | 649.2 | 649.2 | 649.2 | 649.2 | 649.2 |
| 1.4 BD (g) | 496.1 | 496.1 | 496.1 | 496.1 | 496.1 |
| EG (g) | 55.1 | 55.1 | 55.1 | 55.1 | 55.1 |
| PEG (g) | 938.7 | 498.5 | — | — | — |
| PTMG (g) | — | — | 789.2 | 436.8 | 789.2 |
| PPG (g) | — | 257.1 | — | 224.8 | — |
| polyfunctional component (g) | DLM 1.1 PER 0.9 | TRI 2.2 | DEA 0.6 HG 1.1 | DEA 1.4 | — |
| Catalyst B (g) | 13 | 13 | 13 | 13 | 13 |
| Heat resistant B (g) | 15 | 15 | 15 | 15 | 15 |
| Melting point (°C.) | 180~185 | 180~185 | 180~185 | 180~185 | 180~185 |
| Intrinsic viscosity (dl/g) | 1.17 | 1.15 | 1.14 | 1.19 | 1.11 |
| Melt *1 (poise) viscosity | $3.24 \times 10^3$ | $4.90 \times 10^3$ | $3.27 \times 10^3$ | $3.10 \times 10^3$ | $5.11 \times 10^2$ |

*1: Data measured at 220° C.

EXAMPLE 33

The reactor is charged with 378 g of DMT, 166 g of DMI, 400 g of PIMG having an average molecular weight of 2000, 378 g of 1.4 BD, 15 g of catalyst slurry B, 15 g of heat resistant B and 0.88 g of DEA (0.3 mole percent per methyl ester of acid component). The final polymer(Melting point 178° C.) is prepared by a method of EXAMPLE 1. The polymer is made into sheets by a extruder and measured the properties of sheets. The properties are shown in Table 9 (The final temperature of the reactor is 260° C.).

COMPARATIVE EXAMPLE 9~11

The above example 33 is repeated except polyfunctional component in comparative example 9, 0.088 g of DEA(0.03 mole percent per ester component)instead of 0.88 g in comparative example 10 and 5.89 g of DEA(2.0 mole percent per ester component) instead of 0.88 g in comparative example 11. The results are shown in Table 9.

TABLE 9

| EXAMPLE # | EXAMPLE 33 | COMPARATIVE EXAMPLE 9 | 10 | 11 |
|---|---|---|---|---|
| intrinsic Viscosity (dl/g) | 1.10 | 1.17 | 1.15 | 1.89 |
| Tensile Strength *1 (kg/cm$^2$) | 334 | 297 | 293 | 197 |
| Elongation at break *2 (%) | 770 | 690 | 670 | 470 |

*1: Measured in accordance with ASTM D-412, Crosshead Velocity 500 mm/min
*2: Measured in accordance with ASTM D-412.

EXAMPLE 34 and COMPARATIVE 12~13

The reactor is charged with 278.9 g of DMT, 91.4 g of DMI, 287 g of EG, 224 g of PEG having an average molecular weight of 1540, 15 g of catalyst slurry A, and 15 g of heat resistant slurry, and example 33 is repeated.

But, 0.460 g of THAM, 0.510 g of HG(Total polyfunctional component is 0.4 mole percent per ester component) in example 34, 0.035 g of THAM, 0.038 g of HG(Total polyfunctional component is 0.03 mole percent per ester component) in comparative example 12 and 3.470 g of THAM, 3.830 of HG(Total polyfunctional component is 3.0 mole percent per ester component) in comparative example 13 are added. The result are shown in Table 10.

TABLE 10

| EXAMPEL # | EXAMPLE 34 | COMPARATIVE EXAMPLE | |
|---|---|---|---|
| | | 12 | 13 |
| intrinsic Viscosity (dl/g) | 1.32 | 1.28 | 1.49 |
| Tensile Strength *1 (kg/cm²) | 452 | 402 | 267 |
| Elongation at break *2 (%) | 810 | 620 | 340 |

*1: Measured in accordance with ASTM D-412, Crosshead Velocity 500 mm/min
*2: Measured in accordance with ASTM D-412.

EXAMPLE 35

The polymer of example 5 is heated at 250° C. and measured the change of melt viscosity according to the change of time.

The result is shown in Table 11.

COMPARATIVE EXAMPLE 14

The polymer of comparative example 2 is heated at 250° C. and measured the change of melt viscosity according to the change of time. The result is shown in Table 11.

EXAMPLE 36

The polymer of example 9 is heated at 250° C. and measured the change of melt viscosity according to the change of time. The result is shown in Table 11.

COMPARATIVE EXAMPLE 15

The polymer of comparative example 3 is heated at 250° C. and measured the change of melt viscosity according to the change of time. The result is shown in Table 11.

TABLE 11

| Time (min) | EXAMPLE 35 | COMPARATIVE EXAMPLE 14 | EXAMPLE 36 | COMPARATIVE EXAMPLE 15 |
|---|---|---|---|---|
| first stage | $2.11 \times 10^3$ | $3.67 \times 10^2$ | $1.67 \times 10^3$ | $2.86 \times 10^2$ |
| 10 | $2.09 \times 10^3$ | $2.69 \times 10^2$ | $1.66 \times 10^3$ | $2.02 \times 10^2$ |
| 20 | $2.05 \times 10^3$ | $1.57 \times 10^2$ | $1.65 \times 10^3$ | $1.15 \times 10^2$ |
| 30 | $1.97 \times 10^3$ | $6.06 \times 10$ | $1.47 \times 10^3$ | $4.19 \times 10$ |
| 40 | $1.63 \times 10^3$ | not measured | $1.32 \times 10^3$ | not measured |

EXAMPLE 37

The reactor is charged with 720 g of DMT, 440 g of 1,4-BD, 460 g of PTMG having an average molecular weight of 1000, 1.0 g of DEA as a polyfunctional component, 44.7 g of catalyst slurry B and 34 g of heat resistant and the above example 1 is repeated.(The final temperature of the reactor is 250° C.)

COMPARATIVE EXAMPLE 16

The above example 37 is essentially repeated except 2.7 g of trimethyl trimellitate instead of polyfunctional component DEA.

COMPARATIVE EXAMPLE 17

The reactor is charged with 720 g of DMT, 440 g of 1,4-BD, 460 g of PTMG having an average molecular weight of 1000, 0.852 g of glycerol as a polyfunctional component, 3.5 g of symdi-β-naphthyl-phenylene diamine, catalyst slurry of 1,4-BD containing 21.6 weight percent of tetrabutyl titanate and 5.4 weight percent of magnesium acetate to be dried perfectly which is desolved perfectly, and EXAMPLE 37 is repeated again.

COMPARATIVE EXAMPLE 18

The above example 37 is repeated except that polyfunctional component DEA.

The data for the polymer of example 37 and comparative example 16~18, such as condensation time, characteristic viscosity, content of final group and properties are shown in Table 12, the change of melt viscosity at 250° C. is shown in Table 13.

TABLE 12

| EXAMPLE # | EXAMPLE 37 | COMPARATIVE EXAMPLE | | |
|---|---|---|---|---|
| | | 16 | 17 | 18 |
| Condensation Time (min) | 44 | 50 | 51 | 87 |
| melting point (°C.) | 199 | 200 | 201 | 201 |
| intrinsic viscosity (dl/g) | 1.32 | 1.27 | 1.25 | 1.15 |
| —COOH content *1 (g) | 14.4 | 52.1 | 21.3 | 29.4 |
| —OH content *2 (g) | 37.1 | 17.6 | 59.2 | 37.5 |
| Tensile Strength *3 (kg/cm²) | 395 | 353 | 374 | |
| Elongation at break *4 (%) | 720 | 585 | 625 | |
| Hardness *5 (%) | 55 | 56 | 57 | |

*1: Method of measurement for the content of the final carboxyl group
1. 1 ± 0.005 g(Ag) for sample is added to 20 ml of o-cresol and desolved at 100° C. in thermostat.
2. The above solution is neutralized with a ml of 1/25 N NaOH solution.
3. The content of final carboxyl group can be calculated by following formula, where the amount of the NaOH solution used without sample is shown as "b"
content of final $$-COOH(eq/10^6 \text{ g}) = \frac{(a - b) \times 40 \times f}{A}$$

wherein ; f is a revision coefficient of NaOH solution.
*2: Method of measurement for the content of the final hydroxyl group
1. 1 ± 0.005 g of sample is added to 60 ml of α-methyl naphthalene and desolved at 240° C.
2. Cool the above solution to 175° and add 1 g of TABLE 12-continued

| EXAMPLE # | EXAMPLE 37 | COMPARATIVE EXAMPLE | | |
|---|---|---|---|---|
| | | 16 | 17 | 18 | succinic anhydride maintaining for 4 hours at 175° C.
3. Ethanol is added to #2 solution and the precipitate is extracted. Ethanol is dried at 85° C.
4. The above method is repeated 2~3 times for perfect reaction and the extracted is dried perfectly after washing several times with ethanol.
5. If the content of the carboxyl group in the precipitate is indicated by "c", which is measured by the reapeat of the above *1 and the content of the carboxyl group which is measured in *1 is indicated by "d", the content of the hydroxyl group can be calculated as follow.
conetent of the final
final —OH(eq/$10^6$ g) = (c — d).
According to the above measuring method, however, the reaction between the hydroxyl group of the polymer chain and succinic anhydride is difficult to proseed. So, it needs to endow a long reaction time to get a good yield and measure ten times and use on the average of five having a high yield among them to reduce the experimental errors
3 and #4: Measured in accordance with ASTM D-412
5: Shore type data measured byu Durometer

TABLE 13

| Time (min) | EXAMPLE 37 | COMPARATIVE EXAMPLE | | |
|---|---|---|---|---|
| | | 16 | 17 | 18 |
| first stage | 1.32 | 1.27 | 1.25 | 1.15 |
| 20 | 1.30 | 1.42 | 1.14 | 1.01 |
| 40 | 1.28 | 1.39 | 1.03 | 0.88 |
| 60 | 1.20 | * | 0.93 | * |
| 80 | 1.15 | * | * | * |

*: Not measured because of degradation by thermal oxidation.

What is claimed:

1. A branched polyetherester block copolymer comprising hard and soft segments wherein the hard segments comprise a multiplicity of recurring structures of formula I and the soft segments comprise a multiplicity of recurring structures of formula II;

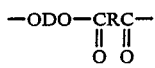   (I)

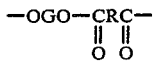   (II)

wherein D is the non-hydroxylic residue of a saturated aliphatic or cyclic diol having 2 to 8 carbon atoms, R is the non-carboxylic residue of an aromatic, aliphatic or cyclic dicarboxylic acid wherein the residue has a molecular weight less than about 500, and G is a polyether having recurring oxyalkylene units and a molecular weight between about 300 and 4,000, said polyetherester block copolymer being branched as a result of the presence of a branching agent during preparation of said copolymer, said branching agent having three or more functional groups wherein at least one of said functional groups is a primary or secondary amine group and the remainder are selected from the group consisting of hydroxyl or carboxyl groups.

2. The polyetherester block copolymer of claim 1 in which the branching agent is selected from the group consisting of diethanol amine, hexamethylene bis(imino acetic acid). tricine, D- or DL- cerine, DL-threonine hemihydrate, DL-aspartic acid, DL-2-methyl glutamic acid, DL-2-amino adipic acid, and tris (hydroxyl methyl) amino methane.

3. The polyetherester block copolymer of claim 2 or 3 in which the branching agent includes a additional branching agent having three or more functional groups selected from the group consisting of hydroxyl and carboxyl groups.

4. The polyetherester block copolymer of claim 3 in which the additional agent is selected from the group consisting of hexaglycerol, trimellitic acid, trimellitic anhydride, pentaerythritol, glyceric acid and gluco-heptonic acid.

5. The polyetherester block copolymer of claim 1 in which the amount of branching agent is from 0.1 to 0.6 mole percent based on the total amount of R.

* * * * *